United States Patent

Noel

[11] Patent Number: 5,851,372
[45] Date of Patent: Dec. 22, 1998

[54] PROCESS FOR DEMINERALIZING A LIQUID CONTAINING ORGANIC MATTER AND SALTS IN SOLUTION

[75] Inventor: Roland Noel, Vidauban, France

[73] Assignee: Societe Anonyme Francaise D'Ingenierie et de Recherche, Vidauban, France

[21] Appl. No.: 732,216
[22] PCT Filed: May 9, 1995
[86] PCT No.: PCT/FR95/00595
§ 371 Date: Oct. 24, 1996
§ 102(e) Date: Oct. 24, 1996
[87] PCT Pub. No.: WO95/30482
PCT Pub. Date: Nov. 16, 1995

[30] Foreign Application Priority Data

May 9, 1994 [FR] France ................................. 94 05682

[51] Int. Cl.⁶ ................................................ B01D 61/44
[52] U.S. Cl. ....................... 204/523; 204/525; 204/530; 204/529
[58] Field of Search .................................. 204/523, 525, 204/530, 529

[56] References Cited

U.S. PATENT DOCUMENTS

| | | | |
|---|---|---|---|
| 3,637,480 | 1/1972 | Passino ............................. | 204/180 P |
| 3,715,287 | 2/1973 | Johnson ............................. | 204/301 |
| 3,781,174 | 12/1973 | Nishijima et al. ................. | 127/46 A |
| 4,138,501 | 2/1979 | Chaveron et al. ................. | 426/239 |
| 5,084,285 | 1/1992 | Shimatani ......................... | 426/271 |

FOREIGN PATENT DOCUMENTS

| | | |
|---|---|---|
| 2391653 | 12/1978 | France . |
| 2447151 | 8/1980 | France . |
| 9212642 | 8/1992 | WIPO . |

OTHER PUBLICATIONS

Database WPI Week 8017 Derwent Publications Ltd. London GB; AN 80-30494C & Chemical Abstracts vol. 95. No.17 26 Oct. 1981 Columbus Ohio US; abstract No. 148835b, B.M. Ennis The Effect of the Replacement of Calcium with Sodium on the Demineralization of Deprot. Acid Whey by Electrodialysis p. 509 colonne 1.
N.Z.J. Dairy Sci. Technol vol. 16 No. 2 1981 pp. 167–178 Ennis (no date).

*Primary Examiner*—Arun S. Phasge
*Attorney, Agent, or Firm*—Sixbey, Friedman, Leedom & Ferguson, P.C.; Gerald J. Ferguson, Jr.; Jeffrey L. Costellia

[57] ABSTRACT

A process of demineralizing a liquid containing organic matter and inorganic salts in solution, in which the treatment of the liquid comprises the following steps:

the liquid is percolated over a strong cationic ion exchange resin for monovalent ions;

both a batch of liquid from the preceding step and a brine for receiving ions from that liquid are caused to circulate in loops through at least one "two-compartment" electrodialyzer comprising a plurality of anionic membranes interposed between a plurality of cationic membranes; and the brine whose salt concentration lies in the range 90 grams per liter (g/l) to 110 g/l is used to regenerate the ion exchange resin.

12 Claims, 2 Drawing Sheets

5,851,372

PROCESS FOR DEMINERALIZING A LIQUID CONTAINING ORGANIC MATTER AND SALTS IN SOLUTION

This application is a 371 of PCT/FR95/00595 filed May 9, 1995.

The invention relates to a process for demineralizing a liquid containing organic substances in solution.

BACKGROUND OF THE INVENTION

In numerous sectors of the food industry there exist liquid products or effluents which contain, in solution, both inorganic salts and organic substances such as proteins, sugars, organic acids and salts thereof, amino acids, . . . .

The organic matter constitutes the fraction of such liquids that has value, while the inorganic salts constitute the unwanted fraction that needs to be extracted.

Extracting such salts, or demineralizing, is not difficult theoretically speaking or in laboratory conditions. However, industrial installations implementing the same principles must also satisfy economic requirements and comply with outside constraints such as respect for the environment and regulations concerning pollution.

Of known techniques for demineralizing such liquids, mention may be made of using ion-exchange resins (cationic or anionic), precipitation (by heat, by alkalinization, . . . ), insolubization (e.g. proteins and lactose with methyl alcohol), dialysis, electrodialysis, filtering through membranes provided for this purpose and making use of physical and osmotic equilibria, . . .

An industrial process necessarily makes use of several such techniques with their respective advantages and drawbacks which constitute selection criteria depending on whether such and such aspect of production is to be advantaged to the detriment of such and such another aspect, giving rise in any event to some particular economic outcome.

By way of illustration, it may be mentioned, for example, that the technique of ion exchange on resins enables a very high degree of demineralization to be obtained, but generates waste that is extremely polluting, causes non-negligible losses of organic matter, and consumes large amounts of reagents and of water.

Electrodialysis of a liquid containing organic matter can provide only partial demineralization, mainly of monovalent salts, and that leads to numerous drawbacks if the liquid to be treated has alkaline-earth metals (calcium, magnesium, . . . ). These are associated with organic matter and constitute a membrane-clogging factor which, in association with the fact that electric charges are reduced in number because of the demineralization, increases the electrical resistance of the system and thus increases its power consumption. Also, this process consumes a great deal of water and requires frequent cleaning. Each cleaning operation requires product to be removed using water, thus diluting it and/or losing treated products. In some cases, it also requires hydraulic and electrical reversals to unclog the membranes.

An installation suitable for implementing successive demineralization and cleaning cycles is complicated with numerous valves, pumps, and pipes.

Filtering, and in particular nanofiltering, uses special membranes which are particularly effective with respect to monovalent ions. Because of osmotic equilibria, demineralization performed by this simple-to-implement technique is limited to 30%–35% of the salts originally present in the liquid to be treated.

OBJECTS AND SUMMARY OF THE INVENTION

The invention relates to a demineralization process, in which:

consumption of water and reagents is reduced to a minimum;

energy consumption is also minimized; and the quantity of waste is reduced while nevertheless making it possible to build an installation that is simple, thereby providing savings in investment, reducing operating costs, and obtaining a product of a quality that is much better than products presently on the market (demineralized at best to 70%–80%).

To this end, the invention provides a process for demineralizing a liquid containing organic matter and inorganic salts in solution, in which treatment of the liquid comprises the following steps:

the liquid is percolated over a strong cationic ion exchange resin;

both a batch of liquid from the preceding step and a brine for receiving ions from that liquid are caused to circulate round loops through at least one "two-compartment" electrodialyzer comprising a plurality of anionic membranes interposed between a plurality of cationic membranes; and the brine whose salt concentration lies in the range 80 grams per liter (g/l) to 140 g/l is used to regenerate the ion exchange resin.

By means of this simple basic process, very large advantages are obtained in economic terms. The liquid percolating over the resin charged with monovalent ions such as $Na^+$ or $K^+$ exchanges its divalent cations for the monovalent ions, such that the substance at the outlet from the ion exchange resin column is a liquid that is practically cleared of its divalent cations such as $Ca^{++}$ or $Mg^{++}$. It constitutes a liquid that has been "softened" like water is softened, i.e. cleared of its calcium, and by using a similar technique.

This absence of alkaline earth ions means that the electrodialyzer into which the "softened" liquid penetrates operates much better. Since it only contains monovalent ions, demineralization takes place much more easily and quickly. Precipitate is no longer observed on the membranes so they do not become clogged. It is no longer necessary to proceed with frequent hydraulic and electrical reversals to clean the electrodialysis cells. Water is used to push matter away only during some cleaning operations (at intervals that are 15 to 20 times greater than the intervals between reversals in electrodialyzers used conventionally in the presence of divalent salts in an organic medium). There is thus less dilution, less loss of product, and less consumption of water.

In addition, and this is most beneficial, the brine now containing only monovalent ions can be concentrated 10 to 15 times more than can a brine containing divalent ions which have the unfortunate tendency of precipitating rapidly when concentration is increased.

The brine flowing through the electrodialyzer can be a solution containing 80 to 140 grams of salt per liter. Under such circumstances, it becomes difficult to control the electrodialyzer which is not sufficiently reliable for industrial purposes when treating a liquid whose concentration of salts is of the order of 5 g/l to 6 g/l.

Two industrial options are therefore proposed to solve this problem that is difficult, at least at present.

The first consists in preconcentrating the substance (extracting ⅔ or ¾ of the initial volume of water) to raise the concentration of salts in the substance treated by electrodialysis to about 25 g/l. It is then possible, under conditions of safety that are satisfactory for the installation, to proceed with a first electrodialysis stage using a brine at a concentration of 90 g/l to 100 g/l. During this first stage, the volume of the highly concentrated brine increases because of the ion transfer and because its salt concentration is regulated by adding brine at 35 g/l. Excess brine is stored in a tank and is used for regenerating the strong cationic resin.

The salt content of the treated substance is thus reduced, thereby increasing its difference relative to the salt content of the brine, thus making the electrodialyzer more difficult to control and leading to a drop in Faraday efficiency. The salt concentration of the brine is therefore lowered by adding water so that it is subsequently maintained, for example, at around 35 g/l to 40 g/l, while the salt content of the liquid being treated may have reached 2.5 g/l. The moment at which this change in concentration is performed is determined as a function of the values of the operating parameters of the electrodialyzer which are continuously monitored.

When demineralization has reached the desired threshold, treatment is stopped and the brine at 35 to 40 grams of salt per liter constitutes the starting brine for treating the following batch.

A second possibility can be envisaged when it is not desirable to preconcentrate the liquid that is to be treated. In this case, the salt concentration of the brine is adjusted to a value (35 g/l to 40 g/l) such that it enables the electrodialyzer to operate optimally, given the concentration of salts in the liquid to be treated (e.g. 5 g/l to 6 g/l for a whey). Simultaneously, in another electrodialyzer or in a fraction of the compartments of the original electrodialyzer, the brine is itself demineralized to another brine which in turn is at a concentration of about 100 g/l.

This concentrated brine possesses at least one additional advantage because of its high degree of concentration (in the range 80 g/l to 140 g/l). It is a solution rich in $Na^+$ and $K^+$ cations suitable for use without any treatment as an agent for regenerating the strong cationic resin. The divalent ions retained by the resin (calcium, magnesium, . . . ) are expelled by the monovalent ions of the brine (sodium, potassium). It will be understood that nothing is rejected other than the salts extracted from the treated liquid, unlike other methods (e.g. when regenerating with hydrochloric acid and caustic soda) where salts are rejected coming from the regenerating agent in addition to the salts that have been extracted.

The process of the invention differs from the usual presently known processes by its lack of need for water and reagent, which gives rise to a considerable saving, and to a final product that is of clearly higher quality than that which is presently known.

The product leaving the electrodialyzer has about 90% to 95% of its inorganic salts removed and it is preconcentrated, with this being done at a cost that is considerably less than that of known processes for the same performance.

To further improve such demineralization, particularly when performed without preconcentration prior to electrodialysis, it is possible to treat the substance by means of an additional nanofiltration step which is made possible by the fact that divalent ions have previously been eliminated by the resin. The permeate consists in water charged with monovalent ions still present in the substance. The quantity of water that can be extracted during this stage is such that the product leaving the nanofilters is concentrated to about 220 grams of dry matter per liter, and this is achieved without particular difficulty.

The water charged with these monovalent ions coming from the nanofiltration step can advantageously be used as water for washing the resin column and it can be injected into the electrodialyzer in which the direction of electrical current flow is simultaneously reversed. This serves to remove any organic impurities that the membranes may have retained during 15 to 20 operating cycles performed without cleaning. Here again, consumption of substances necessary for cleaning is considerably reduced. The water can also constitute the starting material for the brine.

Finally, in a variant embodiment, it is possible to replace the cationic resin column at the beginning of the process with a column having a mixture of strong cationic resin and of strong anionic resin. The advantage of proceeding in this manner comes from the possibility of eliminating a fraction of the organic anions during the first stage of treatment, replacing them with inorganic anions. This reduces the presence of phosphates and sulfates which impede the following stages of electrodialysis and nanofiltration. There is nevertheless a slight drawback of proceeding in this manner: sulfates and phosphates precipitate within the resin. An acceptable solution for eliminating such precipitates during regeneration lies in slightly acidifying the brine or the cleaning liquid in order dissolve the precipitates.

Other characteristics and advantages appear from the following description of an embodiment of the invention given with reference to the accompanying drawings, in which:

MORE DETAILED DESCRIPTION

Figure 1:
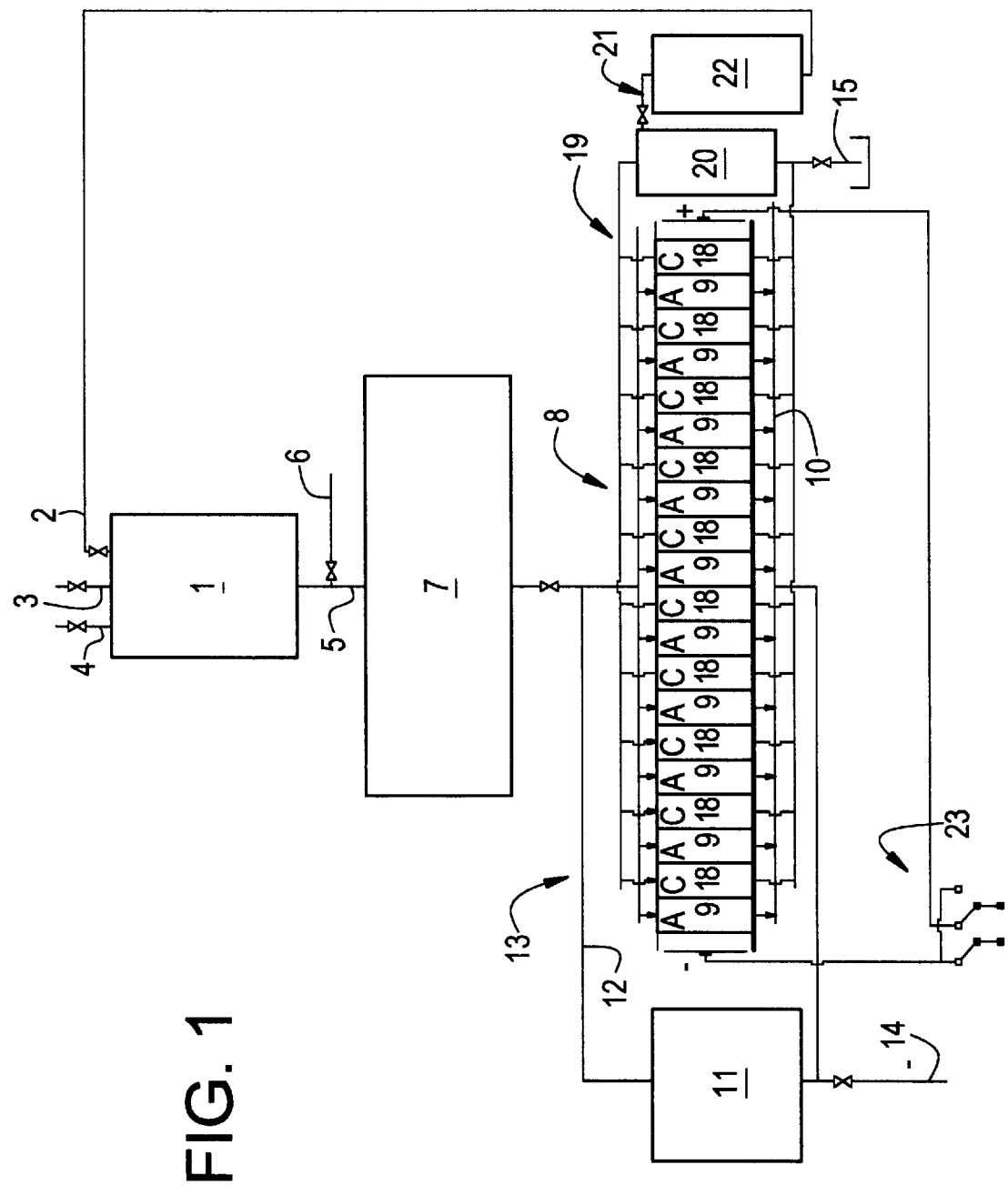
FIG. 1 shows an installation for implementing the various stages of the process of the invention in a version using preconcentration.

For the purposes of description, whey coming from milk from which the casein has been extracted is used as an example of liquid to be demineralized.

A column 1 of strong cationic resin has an inlet 2 for whey to be demineralized, an inlet 3 for regeneration reagent, and an inlet 4 for washing liquid, each having specific valve means to enable said substances to be inserted selectively. The outlet from the column is either taken away at 6 to be rejected or else is injected into a preconcentrator 7 (e.g. operating by evaporation). At the output from the concentrator 7, the whey is injected into a circuit 13 comprising a "two-compartment" electrodialyzer 8 each of whose cells 9 is defined by a cationic membrane C and an anionic membrane A, in conventional manner. In this respect, it should be observed that the membranes are specific to monovalent ions and that the head membranes (those separating the electrolyte surrounding the head electrodes from the adjacent cells) are made of a material known under the trade name NAFION.

Each of the cells 9 is connected to a manifold 10 which puts the electrodialyzer 8 into communication with a tank 11 from which a pipe 12 enables whey to be circulated round a closed loop between the tank 11 and the electrodialyzer 8, thus forming the circuit 13 which has an outlet 14.

The cells 18 of the electrodialyzer 8 which are adjacent to the cells 9 through which whey passes themselves convey a concentration solution (brine) which flows round a loop 19 comprising a tank 20 from which brine can be extracted via a duct 21 (e.g. an overflow) for storage in a tank 22 prior to being fed to the regeneration input 3 of the resin column. A feed 15 is provided for the loop 19 either to feed it with water or else with brine at low concentration.

Finally, FIG. 1 shows an electrical reversing switch 23 which represents a device for supplying feed voltage to the electrodialyzer 8.

The presence of ion exchange resins imposes batch operation in the first stage of the process of the invention, i.e. the liquid is treated in fractions of determined volume. Between two batches, a resin regeneration cycle is performed, and at regular intervals (e.g. every 10 to 12 hours) the entire installation is cleaned. In conventional manner, an industrial installation includes at least two circuits of the kind shown diagrammatically in the figure, connected in parallel so that one circuit treats the liquid while the other is being regenerated or cleaned.

In FIG. 1, the means for circulating the substances through the installation and the various valves and members necessary for controlling it have been omitted since they are common practice in this field.

At the beginning of the treatment cycle, the strong cationic resin 1 is charged with monovalent cations mainly constituted by sodium and potassium. While the whey injected via the inlet 2 percolates over this resin, it exchanges its divalent ions which are mainly calcium and magnesium for monovalent ions. In this respect, it should be observed that when the resin captures a divalent ion, the whey is given two monovalent ions so that at the outlet from the column the nature of the electric charges contained in the whey is different since they are entirely in solution and therefore confer better conductivity to the whey, unlike $Ca^{++}$ ions which are partially bonded to the organic matter. This disposition is highly favorable to good operation of the electrodialyzer 8 into which the whey is to be injected.

The whey is subjected to preconcentration in the concentrator 7 (where it loses ⅔ to ¾ of its water and it comes out therefrom at a temperature lying in the range 30° C. to 40° C., and preferably 36° C.

The whey is then injected into the loop 13 while brine concentrated to about 35 g/l is injected into the loop 19. The whey is demineralized into the brine whose salt concentration rises rapidly to 100 g/l. It is regulated to keep this value, as determined by a conductivity meter, by adding brine concentrated at 35 g/l via the feed 15. Excess brine is extracted from the loop 19 and stored in a tank 22 for regenerating the resin 1.

The concentration of inorganic matter in the preconcentrated whey decreases, e.g. from 23 g/l or 24 g/l to 12 g/l. At this level it is observed that the quality of electricity flow and the Faraday efficiency have dropped so much that it is necessary to change the salt concentration of the brine. By adding water 15, this concentration is lowered to 35 g/l to 40 g/l and is maintained at this value until the preconcentrated whey has been demineralized to the desired extent. Excess brine is likewise stored. The product is then extracted from the loop 13 via the outlet 14.

A new batch of preconcentrated whey is then treated using the brine at 35 g/l to 40 g/l of salt in the loop 19 and its concentration rapidly reaches 100 g/l where it is stabilized as described above with excess brine being recovered in the tank 22. The brine at 35 g/l also serves, as mentioned above, to regulate the brine at 100 g/l.

This degree of concentration is advantageous in several respects firstly because the solution constitutes a brine that is sufficiently rich in sodium and potassium cations to be used directly as a reagent for regenerating the resin column 1, and secondly because of osmotic equilibria, it constitutes means for extracting a fraction of the water contained in the whey circulating through the cells 9. The brine is thus continuously generated by the electrodialyzer so its operation during this first stage of electrodialysis does not consume any water.

The electrodialyzer 8 can operate in batch mode or continuously. When operating continuously, it is fed by a plurality of upstream resin columns in parallel which are connected thereto in succession, with the product circulating continuously through the electrodialyzer and being drawn off therefrom continuously.

Figure 2:
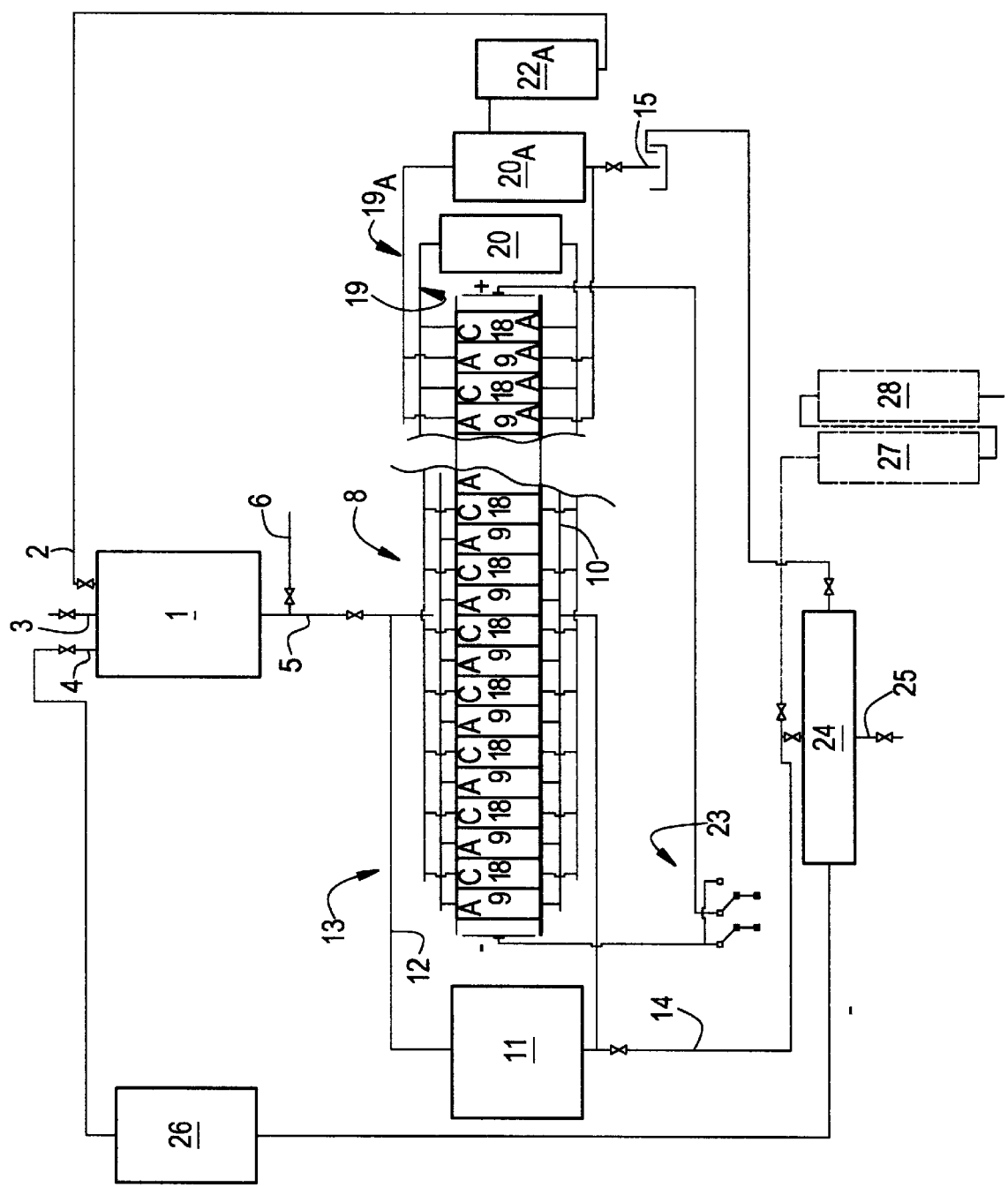
FIG. 2 shows an installation without preconcentration prior to electrodialysis.

FIG. 2 is a diagram of an installation constituting a variant of FIG. 1 which is adapted specifically to circumstances when it is not possible or not desirable to preconcentrate the whey. The whey then conventionally contains 5 to 6 grams of salts per liter. FIG. 2 includes elements already described with reference to FIG. 1 and they are given the same references.

The whey from the column 1 circulates round the loop 13. The loop 19 of brine at 35 to 40 grams of salts per liter comprises the cells 18 as described above plus cells 18A that may be in the same electrodialyzer 8 or in another electrodialyzer and which constitute for the brine cells for extracting salts into adjacent cells 9A that convey other brine at a higher salt concentration (100 g/l). This other brine circulates round a closed loop 19A including a tank 20A for regulating its concentration, with excess therefrom being stored in a tank 22A. Thus, in known manner, the whey is deconcentrated and simultaneously the brine is concentrated.

At the outlet 14, the whey is demineralized to 90% to 95% and can be extracted from the tank 11. In accordance with the invention, if this demineralization is to be taken further, the whey is injected into a nanofiltration unit 24 from which whey is extracted at 25 after being demineralized to 99% and partially concentrated (to around 220 grams of dry matter per liter). The permeate of the nanofiltration is essentially constituted by water with a small content of sodium and potassium ions which can be directed to a buffer tank 26 from which it can be extracted to be discarded or from which it can be applied to the input 4 of the resin column or to the input 15 of the loop 19A. This slightly charged water constitutes a washing liquid that is entirely acceptable for the resin and also, at the outlet from the column, a brine for the electrodialyzer when it needs to be cleaned by electrically reversing its operation.

The process of the invention makes considerable savings possible, particularly with respect to reducing water consumption and having no regenerator, and also with respect to greatly improving the operation of the electrodialyzer, thereby avoiding complex cleaning procedures and a complex installation for alternating such cleaning procedures with stages in the demineralization process. The operating costs and investment required for this process are considerably reduced compared with a conventional process. In addition, the effects that apply to pollution and to waste are considerable, and independently of the economic results of the process of the invention, they comply in much more appropriate manner with regulatory requirements concerning protection of the environment and discharging polluting substances.

Finally, in a variant embodiment, not shown, the resin column 1 may include a mixture of strong cationic resin and of strong anionic resin so as to further improve the operation of the process by eliminating at least a fraction of phosphate or sulfate type anions whose presence is also troublesome for the operation of electrodialyzers. The above-described brine is entirely suitable for regenerating such a column both from the anionic point of view and from the cation point of view, except that a little acid needs to be added to dissolve the sulfate or phosphate that may have precipitated within the column. It is even advantageous to acidulate the washing liquid.

It will be observed that the means 23 for electrically reversing the operation of the electrodialyzer are extremely simple and cheap.

Finally, a variant implementation of the process may include a final stage (instead of and replacing nanofiltration) of passage over (anionic and cationic) ion exchange resins 27 and 28. Resins suitable for such finishing treatment are the cationic resin known under trade name RELITE SK1B from "Résindition" and the anionic resin A 345 from Mitsubishi Kasai Corporation, both of which are very microporous.

I claim:

1. A process of demineralizing a liquid containing organic matter and inorganic salts in solution, wherein the treatment of the liquid comprises the following steps:

the liquid is percolated over a strong cationic ion exchange resin for monovalent ions;

both a liquid from the preceding step and a brine for receiving ions from that liquid are caused to circulate through at least one "two-compartment" electrodialyzer comprising a plurality of anionic membranes interposed between a plurality of cationic membranes said brine is caused to circulate in at least one other electrodialyzer for regulating its concentration to provide another brine, wherein concentration of said another brine lies in the range of 80 grams per liter to 120 grams per liter and wherein said another brine is used to regenerate the ion exchange resin.

2. A process according to claim 1, wherein after the percolation step the liquid is maintained at a temperature in the range of 30° C. to 40° C.

3. A process according to claim 1, including an additional step of demineralization by means of anionic and cationic ion exchange resins.

4. A process according to claim 3, including an additional step of nanofiltration to perform further demineralization and to concentrate the demineralized liquid.

5. A process according to claim 4, wherein a nanofiltration permeate is used as raw material for the brine.

6. A process according to claim 1, wherein said ion exchange resin includes a mixture of strong cationic resin and strong anionic resin.

7. A process according to claim 1, including the additional step of demineralization by means of anionic and cationic ion exchange resins.

8. A process for demineralizing a liquid containing organic matter and inorganic salts in solution, wherein the treatment of the liquid comprises the following steps:

the liquid is percolated over a strong cationic ion exchange resin for monovalent ions; and both a batch of liquid from the preceding step and a brine for receiving ions from that liquid are caused to circulate in loops through at least one "two-compartment" electrodialyzer comprising a plurality of anionic membranes interposed between a plurality of cationic membranes, said electrodialysis taking place in two stages, said two stages including a first stage with brine whose salt concentration is maintained in the range of 80 grams per liter to 140 grams per liter while the salt concentration of the liquid being treated is greater than a predetermined threshold, and a second stage using a brine whose salt concentration is maintained in the range of 30 grams per liter and 40 grams per liter until the predetermined demineralization threshold is reached;

wherein between the percolation step and the electrodialysis step, the liquid is preconcentrated and wherein the brine whose salt concentration lies in the range 80 grams per liter to 140 grams per liter is used to regenerate the ion exchange resin.

9. A process according to claim 8, wherein after the percolation step, the liquid is maintained at a temperature in the range of 30° C. to 40° C. and wherein the liquid is heated by the preconcentration step.

10. A process according to claim 8, including an additional step of nanofiltration to perform further demineralization and to concentrate the demineralized liquid.

11. A process according to claim 10, wherein a nanofiltration permeate is used as raw material for the brine.

12. A process according to claim 8, wherein said ion exchange resin includes a mixture of strong cationic resin and strong anionic resin.

* * * * *